(12) United States Patent
Yoshida

(10) Patent No.: US 11,509,421 B2
(45) Date of Patent: Nov. 22, 2022

(54) DISTRIBUTION MATCHING CIRCUIT, DISTRIBUTION DEMATCHING CIRCUIT, DISTRIBUTION MATCHING METHOD, DISTRIBUTION DEMATCHING METHOD, AND OPTICAL TRANSMISSION SYSTEM

(71) Applicant: Mitsubishi Electric Corporation, Tokyo (JP)

(72) Inventor: Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/118,902

(22) Filed: Dec. 11, 2020

(65) Prior Publication Data
US 2021/0135778 A1    May 6, 2021

Related U.S. Application Data

(63) Continuation of application No. PCT/JP2018/029578, filed on Aug. 7, 2018.

(51) Int. Cl.
*H04L 1/00* (2006.01)
*H04B 10/516* (2013.01)
*H04L 27/36* (2006.01)

(52) U.S. Cl.
CPC ......... *H04L 1/009* (2013.01); *H04B 10/5161* (2013.01); *H04L 27/36* (2013.01)

(58) Field of Classification Search
CPC ..... H04L 1/009; H04L 27/36; H04L 27/3411; H04B 10/5161
USPC ........................................................ 398/185
See application file for complete search history.

(56) References Cited

U.S. PATENT DOCUMENTS

| | | | | |
|---|---|---|---|---|
| 8,130,763 B2* | 3/2012 | Kung | ..................... | H04L 45/00 711/208 |
| 8,243,843 B2* | 8/2012 | Milliner | .............. | H04L 27/2601 375/267 |
| 9,673,907 B1* | 6/2017 | Vassilieva | ........ | H04B 10/07953 |
| 2003/0039318 A1* | 2/2003 | Tong | ................... | H04L 27/3411 375/298 |
| 2003/0099302 A1* | 5/2003 | Tong | ..................... | H04L 1/0066 375/264 |
| 2009/0190597 A1* | 7/2009 | Kung | .................... | H04L 45/742 370/395.32 |

(Continued)

FOREIGN PATENT DOCUMENTS

| | | |
|---|---|---|
| JP | 2000-261324 A | 9/2000 |
| JP | 2001-7706 A | 1/2001 |
| JP | 2017-184234 A | 10/2017 |

OTHER PUBLICATIONS

Böcherer et al., "Bandwidth Efficient and Rate-Matched Low-Density Parity-Check Coded Modulation", IEEE Transaction on Communications, vol. 63, No. 12, Dec. 2015, pp. 4651-4665.

(Continued)

*Primary Examiner* — Abbas H Alagheband
(74) *Attorney, Agent, or Firm* — Birch, Stewart, Kolasch & Birch, LLP

(57) ABSTRACT

In a distribution matching circuit, output data of a plurality of LUTs forming a hierarchical tree structure sequentially designates a combination of signal point groups in a signal space managed by an LUT in an immediately lower level, and signal point information after distribution matching is output for each LUT in the lowermost level.

21 Claims, 8 Drawing Sheets

(56) References Cited

U.S. PATENT DOCUMENTS

| | | | |
|---|---|---|---|
| 2017/0170993 A1* | 6/2017 | Jia | H04L 25/03006 |
| 2018/0145761 A1* | 5/2018 | Zhuge | H04B 10/077 |
| 2019/0363738 A1* | 11/2019 | Strobel | H04L 1/0057 |
| 2019/0363800 A1* | 11/2019 | Zhang | H04L 27/3488 |
| 2021/0135778 A1* | 5/2021 | Yoshida | H04B 10/5161 |

OTHER PUBLICATIONS

Cho et al., "Low-Complexity Shaping for Enhanced Nonlinearity Tolerance", ECOC 2016, $42^{nd}$ European Conference and Exhibition on Optical Communications, Sep. 18-22, 2016, pp. 467-469.
International Search Report issued in PCT/JP2018/029578 (PCT/ISA/210), dated Nov. 20, 2018.
Ramabadran, "A Coding Scheme for m-out-of-n Codes", IEEE Transactions on Communications, vol. 38, No. 8, Aug. 1990, pp. 1156-1163.
Schulte et al., "Constant Composition Distribution Matching", IEEE Transactions on Information Theory, vol. 62, No. 1, Jan. 2016, pp. 430-434.
Yoshida et al., "Low-Complexity Variable-Length Output Distribution Matching with Periodical Distribution Uniformalization", OFC 2018, M4E.2, San Diego, CA, US, Optical Society of America, 2018, pp. 1-3.
Extended European Search Report issued in Application No. 18929173.5 dated Apr. 23, 2021.

* cited by examiner

DISTRIBUTION MATCHING CIRCUIT, DISTRIBUTION DEMATCHING CIRCUIT, DISTRIBUTION MATCHING METHOD, DISTRIBUTION DEMATCHING METHOD, AND OPTICAL TRANSMISSION SYSTEM

CROSS REFERENCE TO RELATED APPLICATIONS

This application is a Continuation of PCT International Application No. PCT/JP2018/029578, filed on Aug. 7, 2018, which is hereby expressly incorporated by reference into the present application.

TECHNICAL FIELD

The present invention relates to a distribution matching circuit, a distribution dematching circuit, a distribution matching method, and a distribution dematching method for performing probabilistic shaping of signal constellation used for communication, and an optical transmission system using the distribution matching circuit, the distribution dematching circuit, the distribution matching method, or the distribution dematching method.

BACKGROUND ART

In order to implement high throughput in optical communication, for example, it is effective to increase the number of levels of multi-level modulation. In a case where the number of levels of multi-level modulation is increased, normally, quadrature amplitude modulation (hereinafter referred to as QAM) is performed on the transmission side of signal communication, and coherent detection and digital signal processing are performed on the reception side.

Meanwhile, when a bit count carried in a QAM signal is increased, the number of signal points is also increased, and the minimum distance between signal points with respect to the average power of the signal is decreased. Consequently, the signal-to-noise ratio (hereinafter referred to as SNR) required to obtain certain communication quality is increased, thereby limiting applicable transmission conditions.

In optical communication, the error rate tolerance is often very small, and, normally, error correction is performed in high-end devices. In particular, in a case where performance is emphasized, soft decision error correction is used. Studies have been made on a combination of multi-level QAM and soft decision error correction, and further study is made on further combining probabilistic shaping therewith.

Technology for shaping the signal constellation includes geometric shaping that shapes the position of each of a plurality of signal points and probabilistic shaping that shapes the probability that each of the plurality of signal points may take. In either case, it is possible to make the relationship of the transmission capacity to the SNR asymptotic to the Shannon limit. This contributes to, for example, increase of the communication capacity of a client signal under given transmission conditions.

For example, Non-Patent Literature 1 describes a method in which probabilistic shaping and error correction are combined. In this approach, distribution matching (DM), which is processing on the transmission side in probabilistic shaping, is performed upstream of error correction encoding, and with an assumption of systematic error correction processing, distribution dematching (invDM), which is processing on the reception side, is performed downstream of error correction decoding. "Matching" here means matching of a communication signal to a Gaussian channel having a certain SNR. Since it is extremely difficult to match ideally, the processing actually performed is approximately equivalent to extending the minimum distance between signal points with respect to the average power of a transmission signal as much as possible.

In the approach described in Non-Patent Literature 1, constant composition DM described in Non-Patent Literature 2 or an m-out-of-n code described in Non-Patent Literature 3 is used for the distribution matching and the distribution dematching in the probabilistic shaping.

CITATION LIST

Non-Patent Literatures

Non-Patent Literature 1: G. Bocherer, P. Schulte and F. Steiner, "Bandwidth Efficient and Rate-Matched Low-Check Coded Modulation", IEEE Transactions on Communications, vol. 63, no. 12, pp. 4651-4665, December 2015.

Non-Patent Literature 2: P. Schulte and G. Bocherer, "Constant Composition Distribution Matching", IEEE Transactions on Information Theory, vol. 62, no. 1, pp. 430-434, January 2016.

Non-Patent Literature 3: T. V. Ramabadran, "A Coding Scheme for m-out-of-n Codes", IEEE Transactions on Communications, vol. 38, no. 8, pp. 1156-1163, August 1990.

SUMMARY OF INVENTION

Technical Problem

In distribution matching and distribution dematching described in Non-Patent Literature 2 and Non-Patent Literature 3, it is necessary to perform integer multiplication or integer addition a number of times in order, and not only the scale of each arithmetic circuit is large, but also the execution speed is slow. In order to reduce the processing delay due to the execution speed, it is necessary to implement a plurality of arithmetic circuits in parallel. Therefore, there is a disadvantage that the scales of a distribution matching circuit and a distribution dematching circuit are very large.

The present invention solves the above disadvantages, and an object of the present invention is to obtain a distribution matching circuit and a distribution dematching circuit that enable downsizing of the circuit scale.

Solution to Problem

A distribution matching circuit and a distribution dematching circuit according to the present invention each include a plurality of lookup tables forming a hierarchical tree structure. An uppermost level lookup table among the plurality of lookup tables of the distribution matching circuit converts a part of external input information, which is information to be communicated being input as a client signal or a framed signal from the outside, into designation information, designating a combination of signal point groups in a signal space, the signal space being managed by each of lookup tables in an immediately lower level of an uppermost level, and outputs the designation information to each of the lookup tables in the immediately lower level of the uppermost level. Each of lookup tables from a level immediately below the uppermost level to a level immediately above a lowermost level among the plurality of lookup tables converts a bit sequence including a part of the external input information and the designation information input from a lookup table belonging to an immediately upper level into the designation information that designates a combination of signal point groups in a signal space managed by each of a plurality of lookup tables in an immediately lower level of each of the intermediate level lookup tables, and outputs the designation information to each of the lookup tables in the immediately lower level of each of the intermediate level lookup tables, and each of a plurality of lowermost level lookup tables among the plurality of lookup tables converts a bit sequence including a part of the external input information and the designation information input from a lookup table of an immediately upper level into signal point information indicating signal constellation in a signal space managed by each of the plurality of lowermost level lookup tables, and outputs the signal point information. The process in the distribution dematching circuit is a process in which input and output are switched from those in the process in the distribution matching circuit.

Advantageous Effects of Invention

According to the present invention, output data of a plurality of lookup tables sequentially designates a combination of signal point groups in a signal space managed by a lookup table in an immediately lower level, and signal point information after distribution matching is output for each lookup table in the lowermost level. The process in the distribution dematching circuit is a process in which input and output are switched from those in the process in the distribution matching circuit. By using a plurality of hierarchized lookup tables, it is not necessary to perform integer multiplication or integer addition a number of times in order in distribution matching, nor to implement a plurality of arithmetic circuits in parallel. As a result, the circuit scales of the distribution matching circuit and the distribution dematching circuit can be reduced.

DESCRIPTION OF EMBODIMENTS

To describe the present invention further in detail, embodiments for carrying out the invention will be described below with reference to the accompanying drawings.

First Embodiment

Figure 1:
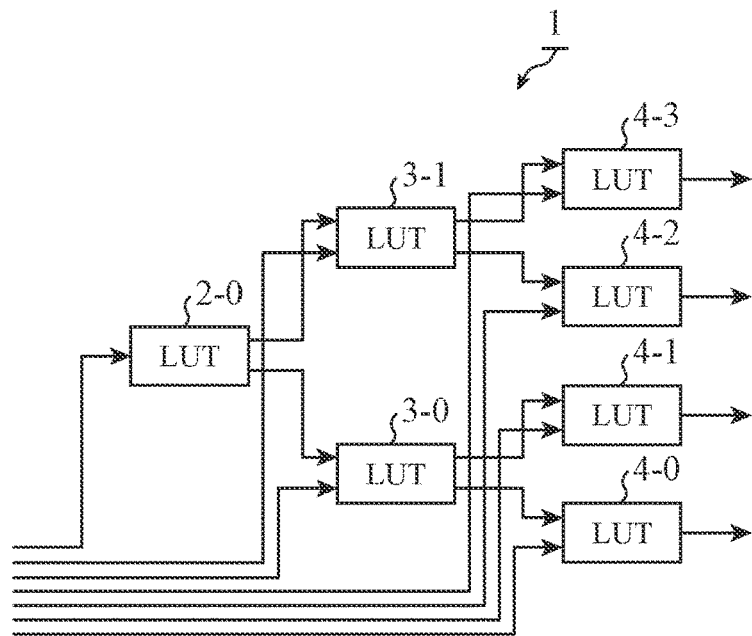
FIG. 1 is a block diagram illustrating the configuration of a distribution matching circuit according to a first embodiment.

FIG. 1 is a block diagram illustrating the configuration of a distribution matching circuit 1 according to a first embodiment. The distribution matching circuit 1 is included in, for example, an optical transmission device and performs matching of the probability distribution of signal points in optical modulation of a transmission signal performed by the optical transmission device. The distribution matching circuit 1 includes a lookup table 2-0, a lookup table 3-0, a lookup table 3-1, a lookup table 4-0, a lookup table 4-1, a lookup table 4-2, and a lookup table 4-3. These lookup tables are arranged to form a hierarchical tree structure as illustrated in FIG. 1. Hereinafter, a lookup table is abbreviated as LUT. Data associated with an address is registered in each of these LUTs.

In FIG. 1, the distribution matching circuit 1 including LUTs forming a hierarchical tree structure of three levels is described. However, the number of levels of the LUTs may be two levels or less or four levels or more. The LUT 2-0 is an LUT of a second level that is the uppermost level. The LUT 3-0 and the LUT 3-1 are LUTs of a first level that is an intermediate level, and the LUT 2-0 is connected with the LUT 3-0 and the LUT 3-1 of the immediately lower level. The LUT 4-0, the LUT 4-1, the LUT 4-2, and the LUT 4-3 are LUTs of a 0th level that is the lowermost level. The LUT 3-0 is connected with the LUT 4-0 and the LUT 4-1 in the immediately lower level, and the LUT 3-1 is connected with the LUT 4-2 and the LUT 4-3 in the immediately lower level.

Each of the LUT 2-0, the LUT 3-0, the LUT 3-1, the LUT 4-0, the LUT 4-1, the LUT 4-2, and the LUT 4-3 manages a signal space. For example, a signal space managed by the LUT 4-0 is a space of two QAM signals (S0), a signal space managed by the LUT 4-1 is a space of other two QAM signals (S1), a signal space managed by the LUT 4-2 is a space of still other two QAM signals (S2), and a signal space managed by the LUT 4-3 is a space of yet other two QAM signals (S3). Under the above conditions, a signal space managed by the LUT 3-0 includes the signal spaces S0 and S1 managed by the LUT 4-0 and the LUT 4-1, and a signal space managed by the LUT 3-1 includes the signal spaces S2 and S3 managed by the LUT 4-2 and the LUT 4-3. The signal space managed by the LUT 2-0 includes the signal spaces S0, S1, S2, and S3 managed by the LUT 3-0 and the LUT 3-1. A signal point is a point of a complex amplitude value in a signal space diagram.

A part of external input information is input to each of the LUT 2-0, the LUT 3-0, the LUT 3-1, the LUT 4-0, the LUT 4-1, the LUT 4-2, and the LUT 4-3. The external input information is an information bit sequence to be communicated, and is externally input to the distribution matching circuit 1 as a client signal or a framed signal. The total value of bit counts of the external input information in one clock cycle is a number represented by a positive integer which can be any integer value. The clock cycle is 2 nanoseconds when the operating frequency of a logic circuit is 500 MHz, for example. An input bit count to each of the LUTs is any integer greater than or equal to 0.

The LUT 2-0 of the second level being the uppermost level converts a part of the external input information into designation information that designates a combination of signal point groups in the signal spaces managed by the LUT 3-0 and the LUT 3-1 of the first level, which is the immediately lower level, and outputs the designation information to the LUT 3-0 and the LUT 3-1 of the first level being an intermediate level. This conversion process is performed by table lookup. Note that table lookup is a process in which the relationship between an address and data is stored in advance, and the data corresponding to the address is read when the address is designated. Input to an LUT corresponds to an address of the LUT, and output from the LUT corresponds to the data of the LUT. The relationship between an address and data usually has a one-to-one correspondence.

The LUT 3-0 of the first level converts a bit sequence including a part of the external input information and designation information of a signal point group from the LUT 2-0 of the second level, which is the immediately upper level, into designation information that designates a combination of signal point groups in the signal spaces managed by the LUT 4-0 and the LUT 4-1 of the 0th level, which is the immediately lower level, and outputs the designation information to the LUT 4-0 and the LUT 4-1 in the lowermost level. That is, a part of an LUT input address is the LUT output data of an immediately upper level, and the rest of the LUT input address is a part of the external input information, and these are both included in designation information. The LUT 3-1 converts a bit sequence including a part of the external input information and designation information of a signal point group from the LUT 2-0 of the immediately upper level into designation information that designates a combination of signal point groups in the signal spaces managed by the LUT 4-2 and the LUT 4-3 of the immediately lower level, and outputs the designation information to the LUT 4-2 and the LUT 4-3 in the lowermost level.

The LUT 4-0 and the LUT 4-1 of the 0th level, which is the lowermost level convert a bit sequence including a part of the external input information and designation information of a signal point group from the LUT 3-0 of the first level, which is the immediately upper level, into signal point information that indicates the signal constellation in the signal spaces managed by the LUT 4-0 and the LUT 4-1, and output the signal point information to the outside. The LUT 4-2 and the LUT 4-3 convert a bit sequence including the external input information and the designation information of the signal point group from the LUT 3-1 of the immediately upper level into signal point information that indicates the signal constellation in the signal spaces managed by the LUT 4-2 and the LUT 4-3, and output the signal point information to the outside.

Note that, in the entire distribution matching circuit 1, the bit count output in one clock cycle is usually larger than the bit count of external input information input in one clock cycle.

The distribution matching circuit 1 performs matching of the distribution of communication signals by this redundancy. The external input information usually has a mark rate of about 0.5 and can be regarded as a bit sequence that has no temporal correlation.

There are cases where the mark rate is close to 0 in Ethernet (registered trademark) signals; in that case, bit scrambling is often performed externally to adjust the mark rate to around 0.5.

Normally, the external input information can be regarded as a bit sequence that has no temporal correlation; however in a probability distribution of signal points modulated by QAM on the basis of an output bit sequence, ideally, matching with a targeted Gaussian channel is performed. In practice, it is difficult to achieve perfect matching; however, the probability distribution of signal points of QAM, for example, is controlled so that the probability that a signal point with low power can have is high and that the probability that a signal point with high power can have is low, thereby extending the minimum distance between signal points with respect to the average power of the modulated signal.

As for input and output bit counts of each of the LUTs included in the distribution matching circuit 1, parameters of input and output interfaces are selected so that the input bit count is the same as the output bit count, or that the output bit count is greater than the input bit count. Incidentally, in FIG. 1, the number of branches between levels is two; however, the number of branches may be any positive integer.

Note that the number of branches refers to the number of LUTs in an immediately lower level and connected to an LUT in an immediately upper level.

Next, the operation will be described.

Figure 2:
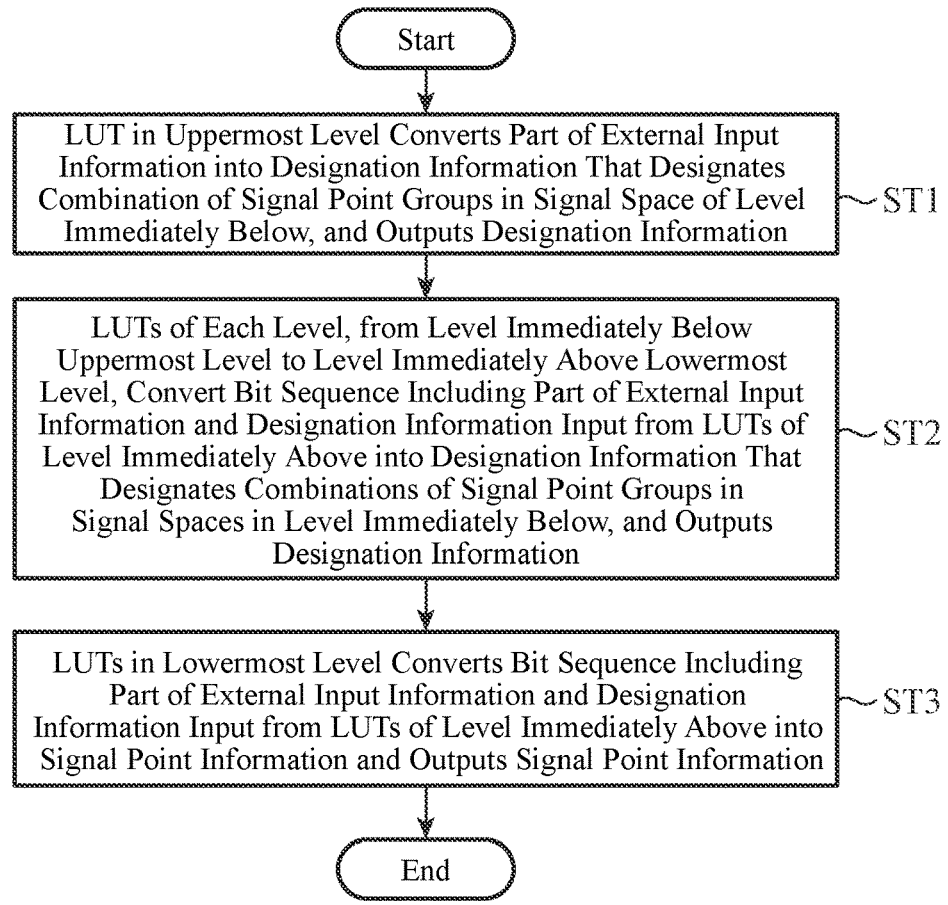
FIG. 2 is a flowchart illustrating a distribution matching method according to the first embodiment.
Figure 3:
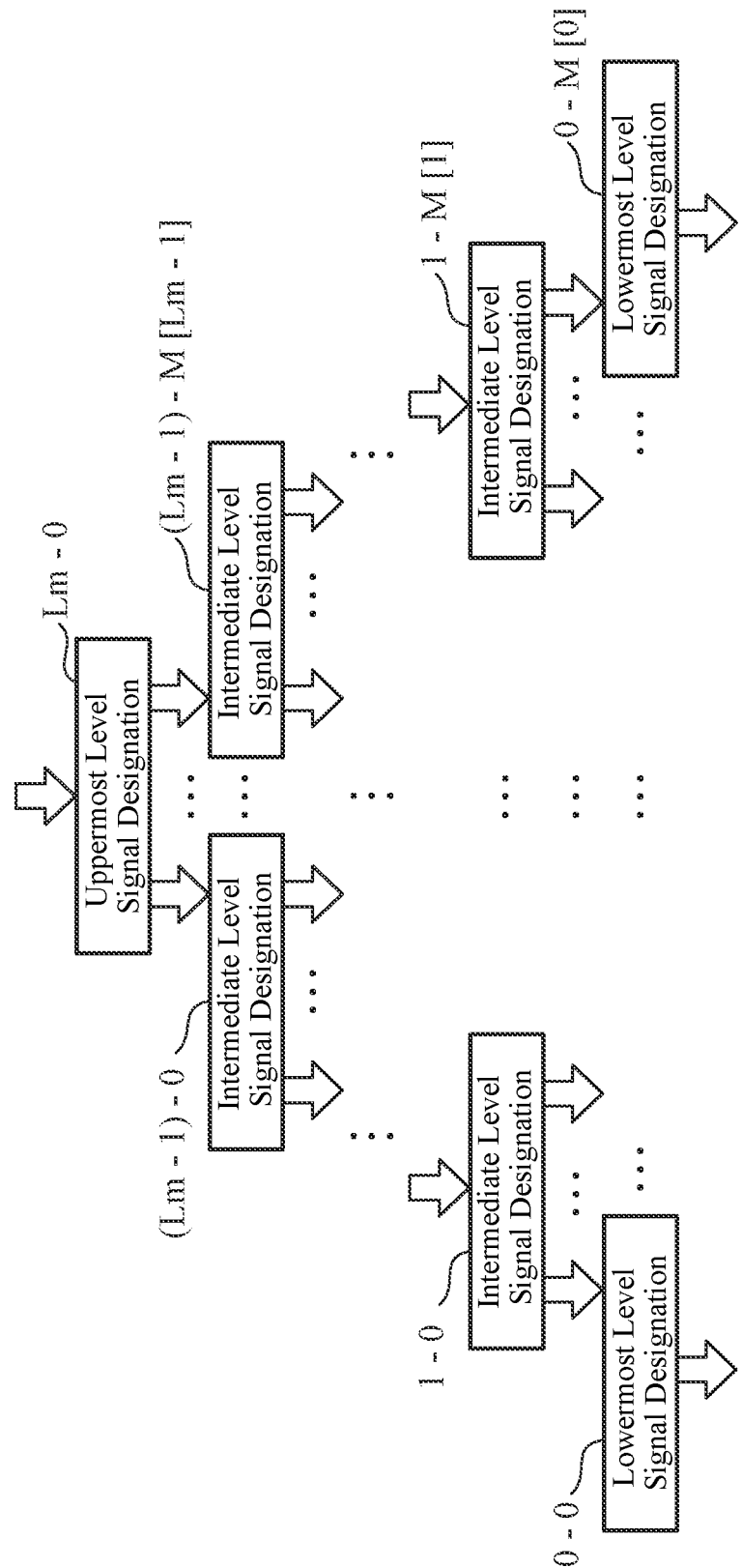
FIG. 3 is a conceptual diagram illustrating an outline of the distribution matching method according to the first embodiment.

FIG. 2 is a flowchart illustrating a distribution matching method according to the first embodiment. FIG. 3 is a conceptual diagram illustrating an outline of the distribution matching method according to the first embodiment. The distribution matching method according to the first embodiment will be described below with reference to the concept illustrated in FIG. 3. In FIG. 3, the number of levels of LUTs is Lm+1, and Lm is an integer greater than or equal to 0. The uppermost level is the Lm-th level, and the lowermost level is the 0th level. Zeroth to M[Lm−1]th LUTs belong to an (Lm−1)th level, and 0th to M[1]th LUTs belong to a first level. Zeroth to M[0]th LUTs belong to the 0th level. Incidentally, LUT (Lm−1)-0 denotes the 0th LUT of the (Lm−1)th level, and LUT 0-M[0] denotes the M[0]th LUT of the 0th level.

The LUT in the uppermost level converts a part of external input information into designation information that designates a combination of signal point groups in a signal space managed by each of a plurality of LUTs in the immediately lower level, and outputs the designation information to each of the plurality of LUTs in the immediately lower level (step ST1). This process is referred to as the "uppermost level signal designation" in FIG. 3. The LUT of the Lm-th level converts a part of the bit sequence of the external input information into signal point group designation bits that are designation information that designates combinations of signal point groups in the signal spaces set in the 0th to M[Lm−1]th LUTs of the (Lm−1)-th level, and outputs the signal point group designation bits to each of the 0th to M[Lm−1]th LUTs.

The LUTs of each of the levels, from the level immediately below the uppermost level to the level immediately above the lowermost level, convert a bit sequence including a part of the external input information and designation information input from LUTs of an immediately upper level into designation information that designates combinations of signal point groups in signal spaces managed by respective LUTs in an immediately lower level, and output the designation information to each of the plurality of LUTs in the immediately lower level (step ST2). This process is referred to as the "intermediate level signal designation" in FIG. 3. The LUTs from the 0th LUT in the (Lm−1)th level to the M[0]th LUT in the first level convert a bit sequence including a part of the external input information and signal point group designation bits input from LUTs of an immediately upper level into signal point group designation bits that are designation information for designating combinations of signal point groups in signal spaces managed by respective LUTs in an immediately lower level, and outputs the signal point group designation bits to each of the plurality of LUTs in the immediately lower level.

Each of the plurality of LUTs in the lowermost level converts a bit sequence including a part of the external input information and designation information input from the LUTs of the immediately upper level into signal point information and outputs the signal point information (step ST3). This process is referred to as the "lowermost level signal designation" in FIG. 3. Each of the 0th to M[0]th LUTs in the 0th level converts a bit sequence including a part of the external input information and signal point group designation bits input from an LUT in the first level, which is the immediately upper level, into signal point information, and outputs the signal point information to the outside. Signal point information indicates the signal constellation in a signal space set in each of the 0th to M[0]th LUTs of the 0th level, and is input information to a symbol mapping circuit arranged at the subsequent stage of the distribution matching circuit 1 in the optical transmission device.

As described above, in the distribution matching circuit 1 according to the first embodiment, output data of a plurality of LUTs forming a hierarchical tree structure sequentially designate a combination of signal point groups in a signal space managed by an LUT in an immediately lower level, and signal point information after distribution matching is output for each LUT in the lowermost level. By using a plurality of hierarchized LUTs, it is not necessary to perform integer multiplication or integer addition a number of times in order in distribution matching, nor to implement a plurality of arithmetic circuits in parallel. As a result, the circuit scale of the distribution matching circuit can be reduced. In addition, since the circuit scale is reduced, the power consumption of the distribution matching circuit can also be reduced.

Note that the distribution matching circuit 1 may not include the LUTs in the intermediate level illustrated in FIG. 1 and may include only the LUTs of the uppermost level and the LUTs of the lowermost level illustrated in FIG. 1. For example, the distribution matching circuit 1 includes a plurality of LUTs that are hierarchized into two levels. The LUT 2-0 in the upper level converts a part of external input information into designation information that designates a combination of signal point groups in a signal space managed by each of the LUT 4-0, the LUT 4-1, the LUT 4-2, and LUT 4-3 belonging to an immediately lower level, and outputs the designation information to each of the LUT 4-0, the LUT 4-1, the LUT 4-2, and LUT 4-3 in the immediately lower level. Each of the LUT 4-0, the LUT 4-1, the LUT 4-2 and the LUT 4-3 in the lower level convert a bit sequence including a part of the external input information and designation information input from the LUT 2-0 of the immediately upper level into signal point information that indicates the signal constellation in a signal space managed by each of the LUT 4-0, the LUT 4-1, the LUT 4-2, and the LUT 4-3 in the lowermost level, and outputs the signal point information. Note that the specific operation of the LUT is similar to the operation content described in the first embodiment.

Furthermore, the distribution matching circuit 1 may not include the LUT in the uppermost level nor the LUTs in the intermediate level illustrated in FIG. 1, but include only the LUTs in the lowermost level. For example, the distribution matching circuit 1 includes the LUT 4-0, the LUT 4-1, the LUT 4-2, and LUT 4-3 belonging to the first level. Each of the LUT 4-0, the LUT 4-1, the LUT 4-2, and LUT 4-3 of the level receives a part of the external input information and designation information for designating a combination of signal point groups in a signal space managed by each of the LUT 4-0, the LUT 4-1, the LUT 4-2, and LUT 4-3 of the level, convers a bit sequence including a part of the external input information and the designation information into signal point information that indicates the signal constellation in a signal space managed by each of the LUT 4-0, the LUT 4-1, the LUT 4-2, and the LUT 4-3 in the level, and outputs the signal point information to the outside. Also with this configuration, the specific operation of the LUTs is similar to the operation content described in the first embodiment.

Second Embodiment

Figure 4:
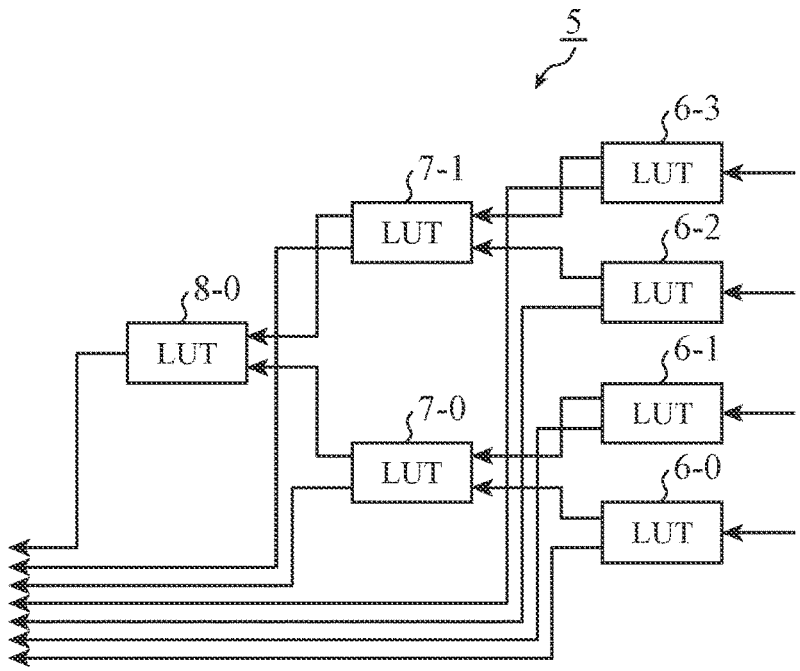
FIG. 4 is a block diagram illustrating the configuration of a distribution dematching circuit according to a second embodiment.

FIG. 4 is a block diagram illustrating the configuration of a distribution dematching circuit 5 according to a second embodiment. The distribution dematching circuit 5 is installed, for example, in an optical reception device, and restores external input information input the distribution matching circuit 1 by performing distribution dematching on signal point information included in a reception signal received from the optical transmission device. As illustrated in FIG. 4, the distribution dematching circuit 5 includes an LUT 6-0, an LUT 6-1, an LUT 6-2, an LUT 6-3, an LUT 7-0, an LUT 7-1, and an LUT 8-0. These LUTs are arranged to form a hierarchical tree structure, and data associated with an address is registered in each of the LUTs.

In FIG. 4, the distribution dematching circuit 5 including LUTs hierarchically arranged into three levels is described. Note that the number of levels of the LUTs may be two levels or less or four levels or more as long as the number of levels is the same as that of the distribution matching circuit 1. The LUT 6-0, the LUT 6-1, the LUT 6-2, and the LUT 6-3 are LUTs of a 0th level that is the lowermost level. The LUT 7-0 and the LUT 7-1 are LUTs of the first level, which is an intermediate level. The LUT 7-0 is connected with the LUT 6-0 and the LUT 6-1 in the immediately lower level, and the LUT 7-1 is connected with the LUT 6-2 and the LUT 6-3 in the immediately lower level. The LUT 8-0 is an LUT of a second level that is the uppermost level. The LUT 8-0 is connected with the LUT 7-0 and the LUT 7-1 in the immediately lower level.

Each of the LUT 6-0, the LUT 6-1, the LUT 6-2, the LUT 6-3, the LUT 7-0, the LUT 7-1, and the LUT 8-0 manages a signal space. For example, a signal space managed by the LUT 6-0 is a space of two QAM signals (S0), a signal space managed by the LUT 6-1 is a space of other two QAM signals (S1), a signal space managed by the LUT 6-2 is a space of still other two QAM signals (S2), and a signal space managed by the LUT 6-3 is a space of yet other two QAM signals (S3). At this point, a signal space managed by the LUT 7-0 includes the signal spaces S0 and S1 managed by the LUT 6-0 and the LUT 6-1, and a signal space managed by the LUT 7-1 includes the signal spaces S2 and S3 managed by the LUT 6-2 and the LUT 6-3. The signal space managed by the LUT 8-0 includes the signal spaces S0, S1, S2, and S3 managed by the LUT 7-0 and the LUT 7-1. A signal point is a point of a complex amplitude value in a signal space diagram.

Signal point information from the LUT 4-0, the LUT 4-1, the LUT 4-2, and LUT 4-3 in the distribution matching circuit 1 is input to the LUT 6-0, the LUT 6-1, the LUT 6-2, and LUT 6-3. The LUT 6-0 and the LUT 6-1 restore, from bit sequences of signal point information, parts of the external input information input to the LUT 4-0 and the LUT 4-1 in the distribution matching circuit 1 and designation information from the LUT 3-0 in the immediately upper level. The LUT 6-2 and the LUT 6-3 restore, from bit sequences of signal point information, parts of the external input information input to the LUT 4-2 and the LUT 4-3 in the distribution matching circuit 1 and designation information from the LUT 3-1 in the immediately upper level.

The LUT 7-0 of the first level, which is an intermediate level, restores, from a bit sequence of the designation information restored by the LUT 6-0 and the LUT 6-1 immediately below, a part of the external input information and designation information from the LUT 2-0 in the second level in the distribution matching circuit 1. Likewise, the LUT 7-1 of the first level restores, from a bit sequence of the designation information restored by the LUT 6-2 and LUT 6-3, a part of the external input information and designation information from the LUT 2-0 in the second level in the distribution matching circuit 1. The LUT 8-0 of the second level, which is the uppermost level, restores, from a bit sequence of the designation information restored by the LUT 7-0 and the LUT 7-1 in the immediately lower level, a part of the external input information input to the LUT 2-0 in the second level in the distribution matching circuit 1, and outputs all the restored external input information to the outside.

Note that, in the entire distribution dematching circuit 5, the bit count output in one clock cycle is usually smaller than the bit count input in one clock cycle. This corresponds to restoring an information bit sequence to be communicated by performing distribution dematching on a bit sequence that is obtained by demapping signals that are made redundant in distribution matching and has a biased probability distribution of signal points modulated by, for example, QAM. The information bit sequence to be communicated corresponds to the external input information in distribution matching, and usually has a mark rate of about 0.5 and is a bit sequence having no temporal correlation. Incidentally, in FIG. 4, the number of branches between levels is two; however, the number of branches may be any positive integer.

Next, the operation will be described.

Figure 5:
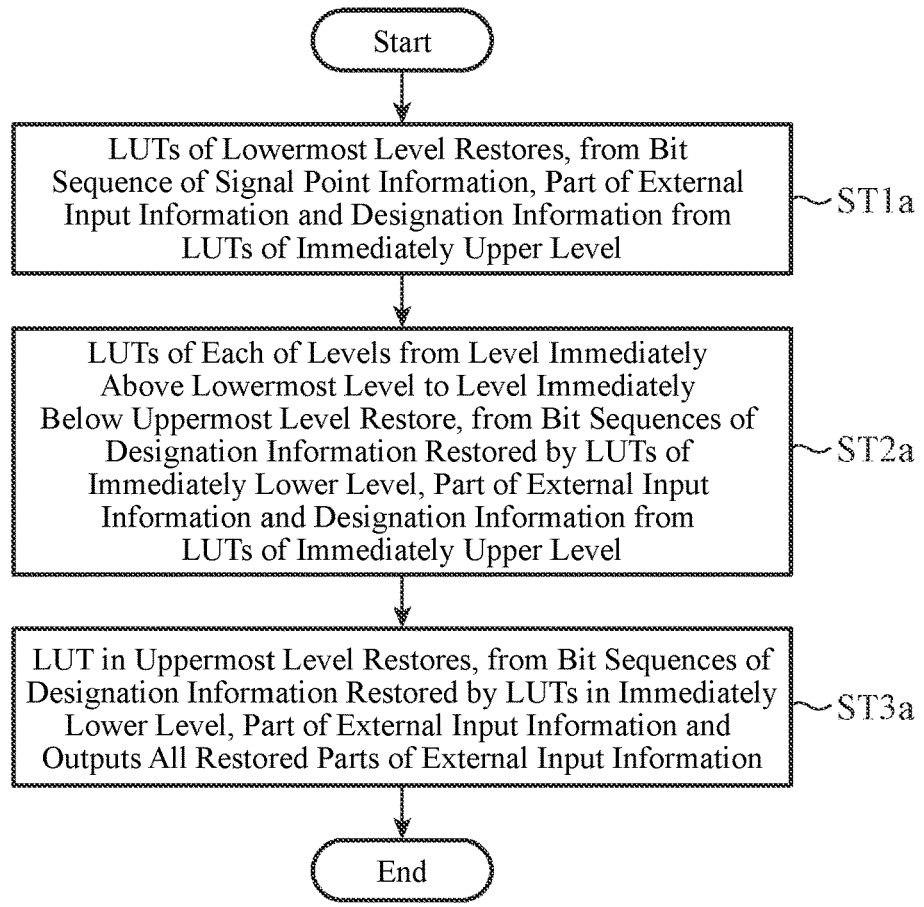
FIG. 5 is a flowchart illustrating a distribution dematching method according to the second embodiment.
Figure 6:
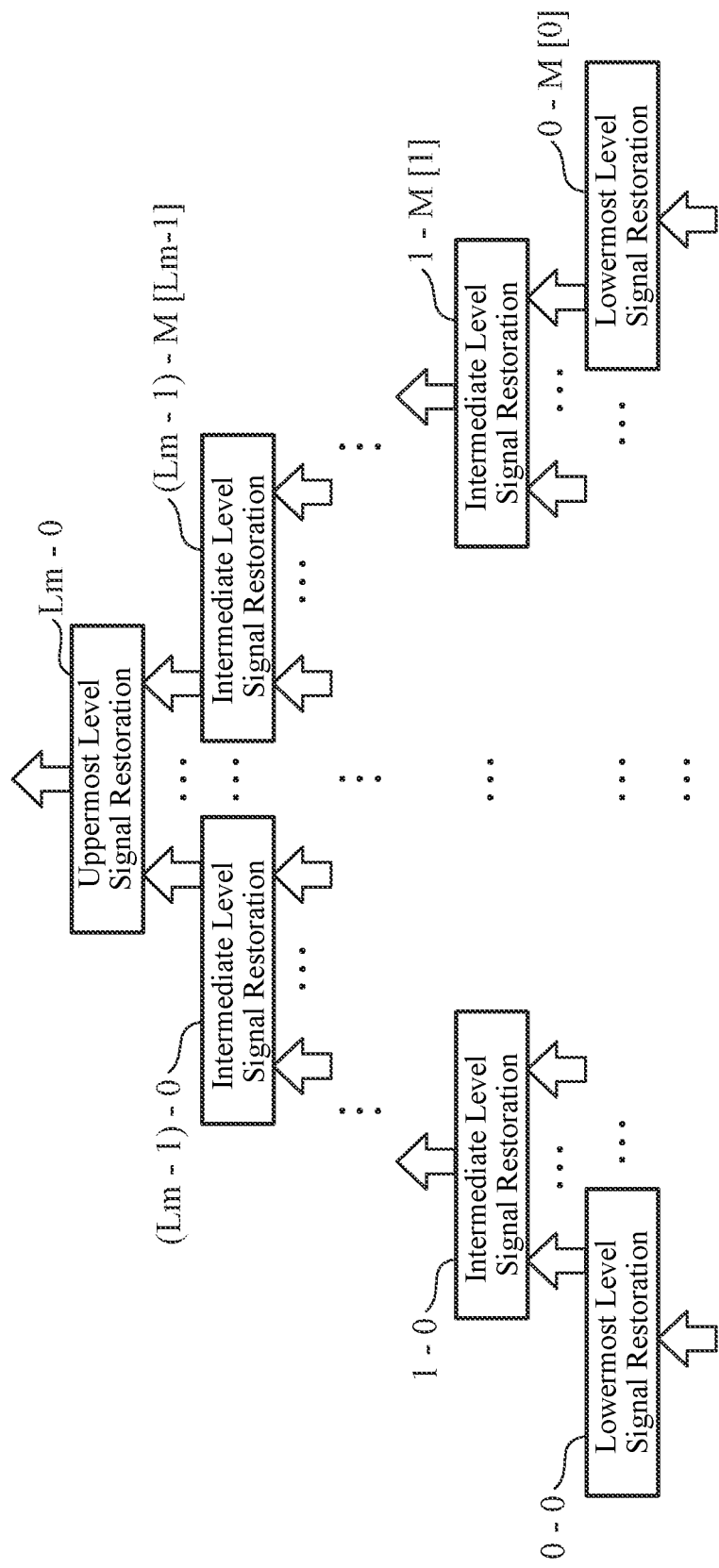
FIG. 6 is a conceptual diagram illustrating an outline of the distribution dematching method according to the second embodiment.

FIG. 5 is a flowchart illustrating a distribution dematching method according to the second embodiment. FIG. 6 is a conceptual diagram illustrating an outline of the distribution dematching method according to the second embodiment. The distribution dematching method according to the second embodiment will be described below with reference to the concept illustrated in FIG. 6. In FIG. 6, the number of levels of LUTs is Lm+1, and Lm is an integer greater than or equal to 0. The uppermost level is an Lm-th level, and the lowermost level is a 0th level. Zeroth to M[Lm−1]th LUTs belong to an (Lm−1)th level, and 0th to M[1]th LUTs belong to a first level. Zeroth to M[0]th LUTs belong to the 0th level. Incidentally, LUT (Lm−1)-0 denotes the 0th LUT of the (Lm−1)th level, and LUT 0-M[0] denotes the M[0]th LUT of the 0th level.

Each of the plurality of LUTs belonging to the lowermost level restores, from a bit sequence of signal point information output from the distribution matching circuit 1 and obtained via a communication channel, the external input information and designation information from the LUTs of the immediately upper level (step ST1a). This process is referred to as the "lowermost level signal restoration" in FIG. 6. Note that the communication channel includes a symbol mapping circuit on the transmission side and a symbol demapping circuit on the reception side. Each of the 0th to M[0]th LUTs of the 0th level converts a bit sequence to be used as the signal point information into restored data of signal point group designation bits that designates a combination of signal point groups in a signal space managed by an LUT of the first level that is the immediately upper level and restored data of a part of the external input information, and outputs the restored data of signal point group designation bits to the LUT of the first level, and outputs the restored data of a part of the external input information to the outside. This conversion process is performed by table lookup. Input to an LUT corresponds to an address, and output from the LUT corresponds to the data. The relationship between an address and data usually has a one-to-one correspondence. The restored data of a part of the external input information is obtained by restoring the external input information input to the LUTs of the 0th level in the distribution matching circuit 1.

LUTs of each of levels from a level immediately above the lowermost level to a level immediately below the uppermost level restore, from bit sequences of designation information restored by LUTs of an immediately lower level, a part of the external input information and designation information from LUTs of an immediately upper level (step ST2a). This process is referred to as the "intermediate level signal restoration" in FIG. 6. The 0th LUT of the first level to the M[Lm−1]th LUT of the (Lm−1)th level converts a bit sequence included in signal point group designation bits restored by LUTs of an immediately lower level into restored data of signal point group designation bits that designate a combination of signal point groups in a signal space of an LUT of an immediately upper level and restored data of a part of the external input information, and outputs the restored data of signal point group designation bits to an LUT of an immediately upper level, and outputs the restored data of a part of the external input information to the outside. The restored data of a part of the external input information is obtained by restoring the external input information input to an LUT in the (Lm−1)th level from the corresponding first level in the distribution matching circuit 1.

The LUT in the uppermost level restores, from bit sequences of designation information restored by LUTs in an immediately lower level, a part of the external input information in the distribution matching circuit 1 and outputs all the restored external input information to the outside (step ST3a). This process is referred to as the "uppermost level signal restoration" in FIG. 6. The LUT of the Lm-th level converts signal point group designation bits input from the 0th to M[Lm−1]th LUTs of the (Lm−1)-th level to restored data of a part of the external input information, and outputs the restored data of a part of the external input information to the outside. This external input information is obtained by restoring the external input information input to the LUTs of the Lm-th level in the distribution matching circuit 1.

As described above, in the distribution dematching circuit 5 according to the second embodiment, a plurality of LUTs forming a hierarchical tree structure restores a part of the external input information and designation information input to LUTs of a corresponding levels in the distribution matching circuit 1, and the LUT in the uppermost level restores the external input information input to LUTs of a corresponding level in the distribution matching circuit 1 and outputs the restored external input information. By using a plurality of hierarchized LUTs, it is not necessary to perform integer multiplication or integer addition a number of times in order in distribution dematching, nor to implement a plurality of arithmetic circuits in parallel. As a result, the circuit scale and the power consumption of the distribution dematching circuit can be reduced. In addition, even if there is an error in a reception signal including signal point information, the external input information in the distribution matching circuit 1 can be partially restored, and thus the number of errors in the signal after the distribution dematching is not significant. Therefore, although it is impossible in the conventional technology to perform error correction on a signal after distribution dematching, the signal after the distribution dematching by the distribution dematching circuit 5 can be corrected for errors.

Next, a hardware configuration for implementing the functions of the distribution matching circuit 1 or the distribution dematching circuit 5 will be described.

The functions of the LUTs in the distribution matching circuit 1 and the functions of the LUTs in the distribution dematching circuit 5 are implemented by a processing circuit. That is, the distribution matching circuit 1 includes a processing circuit for executing the processes from step ST1 to step ST3 illustrated in FIG. 2. Likewise, the distribution dematching circuit 5 includes a processing circuit for executing the processes from step ST1a to step ST3a illustrated in FIG. 5. The processing circuit may be dedicated hardware or a central processing unit (CPU) for executing a program stored in a memory.

Figure 7A:
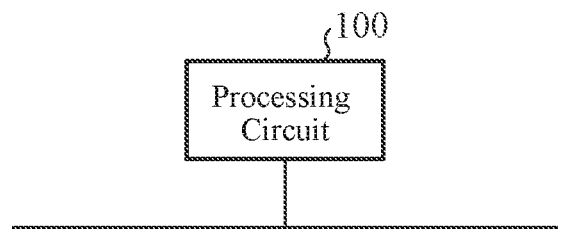
FIG. 7A is a block diagram illustrating the hardware configuration for implementing functions of the distribution matching circuit according to the first embodiment or the distribution dematching circuit according to the second embodiment.
Figure 7B:
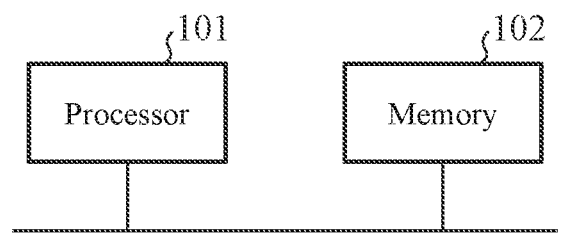
FIG. 7B is a block diagram illustrating the hardware configuration for executing software for implementing functions of the distribution matching circuit according to the first embodiment or the distribution dematching circuit according to the second embodiment.

FIG. 7A is a block diagram illustrating the hardware configuration for implementing the functions of the distribution matching circuit 1 or the distribution dematching circuit 5. FIG. 7B is a block diagram illustrating the hardware configuration for executing software for implementing the functions of the distribution matching circuit 1 or the distribution dematching circuit 5.

In the case where the processing circuit is a processing circuit 100 of dedicated hardware illustrated in FIG. 7A, the processing circuit 100 may be, for example, a single circuit, a composite circuit, a programmed processor, a parallel programmed processor, an application specific integrated circuit (ASIC), a field-programmable gate array (FPGA), or a combination thereof. The functions of the LUTs in the distribution matching circuit 1 or the functions of the LUTs in the distribution dematching circuit 5 may be implemented by separate processing circuits, or may be collectively implemented by a single processing circuit.

In the case where the processing circuit is a processor 101 illustrated in FIG. 7B, the functions of the LUTs in the distribution matching circuit 1 or the functions of the LUTs in the distribution dematching circuit 5 are implemented by software, firmware, or a combination of software and firmware. Note that the software or the firmware is described as a program and is stored in a memory 102. The processor 101 implements the functions of the LUTs in the distribution matching circuit 1 or the functions of the LUTs in the distribution dematching circuit 5 by reading and executing the program stored in the memory 102. That is, the distribution matching circuit 1 includes the memory 102 for storing programs execution of which by the processor 101 results in execution of the processes of steps ST1 to ST3 illustrated in FIG. 2. Likewise, the distribution dematching circuit 5 includes the memory 102 for storing programs execution of which by the processor 101 results in execution of the processes of steps ST1a to ST3a illustrated in FIG. 5.

These programs cause a computer to execute the procedure or the method of the LUTs in the distribution matching circuit 1 or the LUTs in the distribution dematching circuit 5. The memory 102 may be a computer-readable storage medium that stores a program for causing a computer to function as the LUTs in the distribution matching circuit 1 or the LUTs in the distribution dematching circuit 5.

The memory 102 corresponds to a nonvolatile or volatile semiconductor memory such as a random access memory (RAM), a read only memory (ROM), a flash memory, an erasable programmable read only memory (EPROM), or an electrically-EPROM (EEPROM), a magnetic disc, a flexible disc, an optical disc, a compact disc, a mini disc, a DVD, or the like.

Third Embodiment

Figure 8:
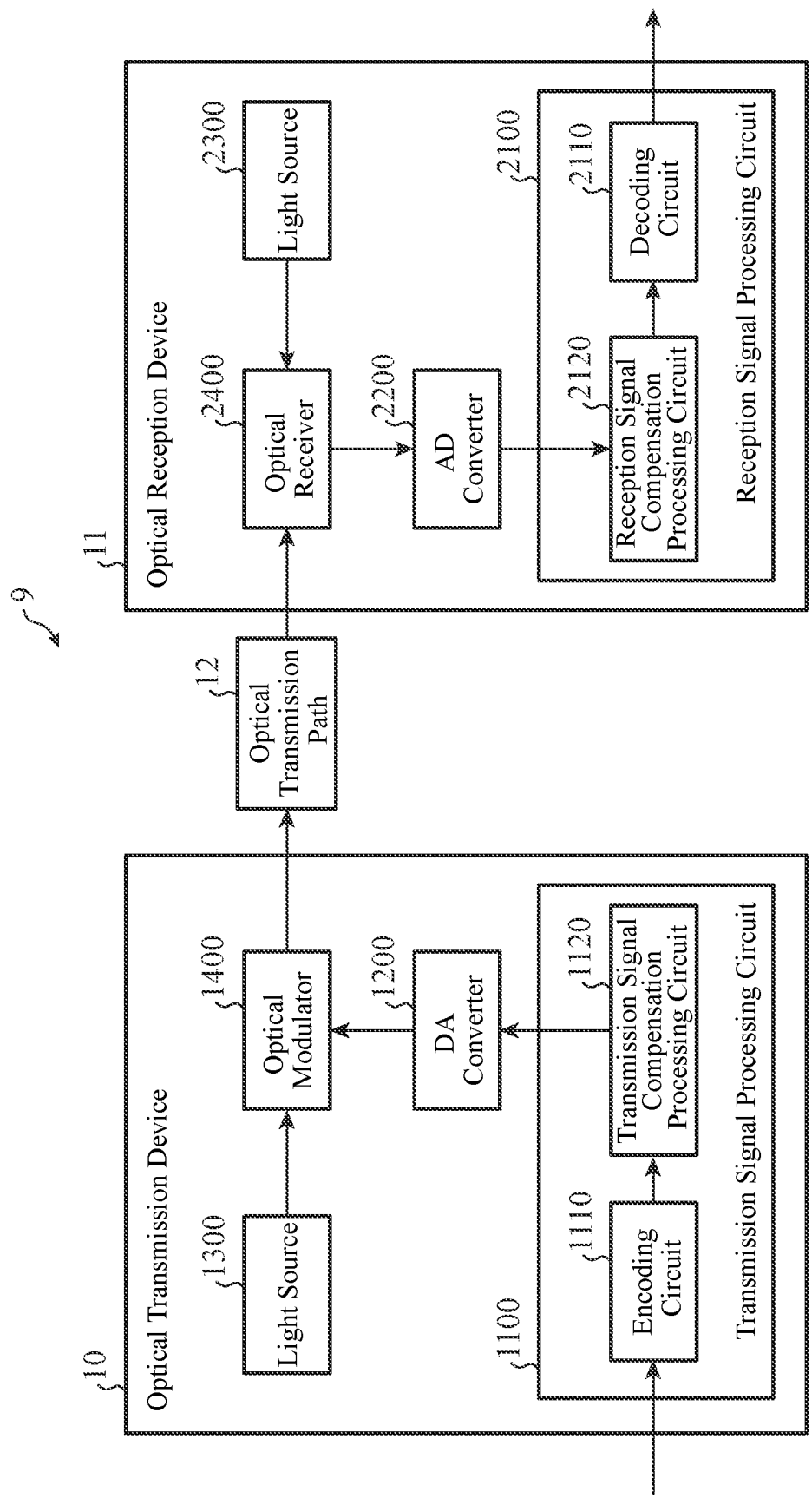
FIG. 8 is a block diagram illustrating the configuration of an optical transmission system according to a third embodiment.

FIG. 8 is a block diagram illustrating the configuration of an optical transmission system 9 according to a third embodiment. In FIG. 8, the optical transmission system 9 includes an optical transmission device 10, an optical reception device 11, and an optical transmission path 12. The optical transmission device 10 outputs an optical signal obtained by encoding external input information to the optical transmission path 12. The external input information is a client signal or a frame signal. That is, the optical transmission device 10 generates an optical signal obtained by encoding a client signal or a frame signal and outputs the optical signal to the optical transmission path 12.

The optical reception device 11 decodes the external input information on the basis of the optical signal received via the optical transmission path 12. For example, the optical reception device 11 converts the optical signal received from the optical transmission device 10 into a client signal or a frame signal and outputs the client signal or the frame signal to the outside. The optical transmission path 12 is a transmission path that transmits an optical signal from the optical transmission device 10 to the optical reception device 11, and includes, for example, an optical fiber, an optical amplifier, a wavelength multiplexer, a wavelength demultiplexer, an optical power monitor, and a wavelength selection switch.

As illustrated in FIG. 8, the optical transmission device 10 includes a transmission signal processing circuit 1100, a DA converter 1200, a light source 1300, and an optical modulator 1400. The transmission signal processing circuit 1100 performs signal processing on a client signal or a frame signal that is the external input information and outputs the processed signal to the DA converter 1200. The transmission signal processing circuit 1100 includes an encoding circuit 1110 and a transmission signal compensation processing circuit 1120.

The encoding circuit 1110 performs encoding processing on the client signal or the frame signal input from the outside, and outputs the encoded signal to the transmission signal compensation processing circuit 1120. The transmission signal compensation processing circuit 1120 performs signal spectrum shaping and nonlinear response compensation with respect to the optical transmission device 10 on the encoded signal input from the encoding circuit 1110, and outputs the compensated signal to the DA converter 1200. The DA converter 1200 performs digital-analog conversion processing and electric amplification on the digital signal input from the transmission signal processing circuit 1100 and outputs the digital signal to the optical modulator 1400.

The light source 1300 is a transmission light source that generates continuous light and outputs the continuous light to the optical modulator 1400. The continuous light is, for example, continuous light oscillated at a wavelength of 1550 nm. The optical modulator 1400 modulates the continuous light input from the light source 1300 with the electric signal input from the DA converter 1200, and outputs the modulated optical signal to the optical transmission path 12. As the optical modulator 1400, for example, a quadrature phase optical modulator of a polarization multiplexed Mach-Zehnder type using lithium niobate is used.

As illustrated in FIG. 8, the optical reception device 11 includes a reception signal processing circuit 2100, an AD converter 2200, a light source 2300, and an optical receiver 2400. The light source 2300 is a local oscillation light source that generates continuous light and outputs the continuous light to the optical receiver 2400. The continuous light is, for example, continuous light oscillated at a wavelength of 1550 nm. The optical receiver 2400 causes a mixed interference between an optical signal received from the optical transmission device 10 via the optical transmission path 12 and the continuous light input from the light source 2300, photoelectrically converts this optical signal, and then outputs the converted signal to the AD converter 2200. As the optical receiver 2400, for example, a coherent receiver of a polarization phase diversity type is used.

The AD converter 2200 amplifies the electric signal input from the optical receiver 2400, then performs analog-to-digital conversion, and outputs the signal to the reception signal processing circuit 2100. The reception signal processing circuit 2100 restores the client signal or the frame signal, which is the external input information, on the basis of the digital signal input from the AD converter 2200, and outputs the restored signal to the outside.

The reception signal processing circuit 2100 includes a decoding circuit 2110 and a reception signal compensation processing circuit 2120. The reception signal compensation processing circuit 2120 performs sampling phase synchronization, waveform equalization, restoration of the carrier frequency and the phase on the digital signal input from the AD converter 2200, and outputs the digital signal to the decoding circuit 2110. The decoding circuit 2110 performs decoding processing on the digital signal input from the reception signal compensation processing circuit 2120, and outputs the restored client signal or frame signal to the outside.

Figure 9:
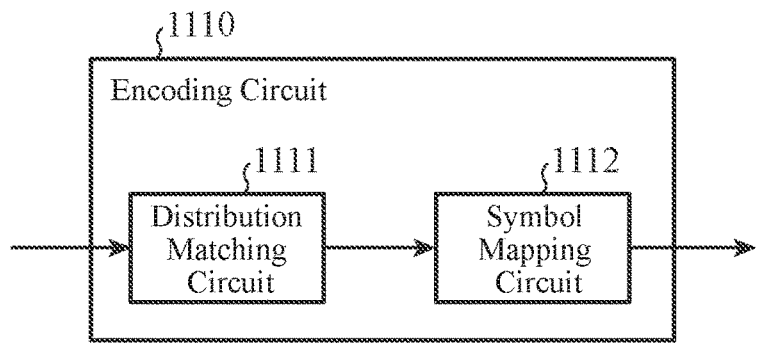
FIG. 9 is a block diagram illustrating the configuration of an encoding circuit in FIG. 8.

FIG. 9 is a block diagram illustrating the configuration of the encoding circuit 1110 in FIG. 8. The encoding circuit 1110 includes a distribution matching circuit 1111 and a symbol mapping circuit 1112, as illustrated in FIG. 9. The distribution matching circuit 1111 is the distribution matching circuit 1 described in the first embodiment, and receives a client signal or a frame signal which is the external input information, performs the distribution matching described in the first embodiment, and outputs signal point information obtained by the distribution matching to the symbol mapping circuit 1112.

The symbol mapping circuit 1112 converts the signal point information input from the distribution matching circuit 1111 into a modulation symbol, and outputs the modulation symbol to the transmission signal compensation processing circuit 1120. For example, the symbol mapping circuit 1112 collects signal point information from the LUTs in the lowermost level of the distribution matching circuit 1111 by every three bits to generate a one-sided pulse-amplitude modulation symbol having an amplitude of eight values. The eight amplitude values are −7, −5, −3, −1, 1, 3, 5, and 7. At this point, in a case where the amplitude values are different by one stage, a gray code in which input bits are different by one bit is used.

In a case where the distribution matching circuit 1111 has the configuration illustrated in FIG. 1, the signal point information output from each of the LUT 4-0, the LUT 4-1, the LUT 4-2, and LUT 4-3 of the 0th level, which is the lowermost level, may be sorted and listed, for example, under the following conditions. The listed signal point information is associated with addresses in ascending order.

(1) Sort in ascending order of modulation symbol power defined after the signal point information has been converted into modulation symbols by the symbol mapping circuit 1112.

(2) Sort in descending order of the number of 0s included in the signal point information.

(3) Sort in descending order of the number of 1s included in the signal point information.

Moreover, LUTs belonging to an immediately upper level may restrict the table lookup in LUTs belonging to an immediately lower level. In a case where the distribution matching circuit 1111 has the configuration illustrated in FIG. 1, for example, the LUT of the first level restricts the table lookup in the LUTs of the 0th level. "To restrict the table lookup" means to designate a signal point group that can be used in the signal space. For example, an LUT belonging to an immediately upper level sorts signal point group designation bits to be output to LUTs belonging to an immediately lower level under the following conditions. The sorted signal point group designation bits are associated in ascending order of address.

(1) Sort in ascending order of expected values of modulation symbol power defined after the signal point information has been converted into modulation symbols by the symbol mapping circuit 1112.

(2) Sort in descending order of expected values of the number of 0s included in the signal point information.

(3) Sort in descending order of expected values of the number of 1s included in the signal point information.

Thus, the modulation symbols obtained by inputting the signal point information, generated by defining the relationship between the address and data of LUTs, to the symbol mapping circuit 1112 has such a bias that, for example, the probability of using signal points of low power is high, whereas the probability of using signal points of high power is low.

Figure 10:
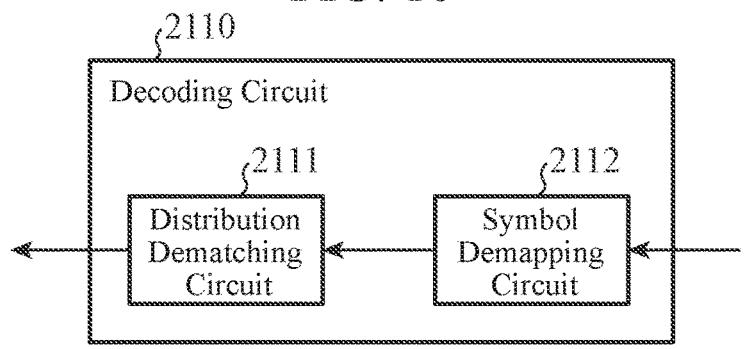
FIG. 10 is a block diagram illustrating the configuration of a decoding circuit in FIG. 8.

FIG. 10 is a block diagram illustrating the configuration of the decoding circuit 2110 in FIG. 8. As illustrated in FIG. 10, the decoding circuit 2110 includes a distribution dematching circuit 2111 and a symbol demapping circuit 2112. The symbol demapping circuit 2112 performs soft decision likelihood generation or hard decision on the digital signal input from the reception signal compensation processing circuit 2120. The soft decision likelihood is a reception bit likelihood, and a hard decision value is a reception bit sequence.

In the symbol demapping circuit 2112, the occurrence probability of modulation symbols generated by the encoding circuit 1110 is considered. For example in a case where a soft decision value is output, a log posterior probability ratio (posterior L-value) is represented by three or more values, and in a case where a hard decision is performed, a hard decision value is represented by a binary value (1 bit). The likelihood or a hard decision value obtained by the symbol demapping circuit 2112 is output to the distribution dematching circuit 2111.

The distribution dematching circuit 2111 is the distribution dematching circuit 5 illustrated in the second embodiment. The distribution dematching circuit 2111 performs the distribution dematching described in the second embodiment on the signal input from the symbol demapping circuit 2112, and outputs the client signal or the frame signal restored by the distribution dematching to the outside.

Note that, in the optical transmission system 9, the distribution matching circuit 1111 included in the optical transmission device 10 and the distribution dematching circuit 2111 included in the optical reception device 11 need to be paired in terms of input and output bit counts of the LUTs. For example, in a case where the distribution matching circuit 1111 is the distribution matching circuit 1 illustrated in FIG. 1 and the distribution dematching circuit 2111 is the distribution dematching circuit 5 illustrated in FIG. 4, the input bit count of the 0th LUT 3-0 of the first level in the distribution matching circuit 1 is equal to the output bit count of the LUT 7-0 having the same number (0th) in the first level in the distribution dematching circuit 5. Likewise, the output bit count of the 0th LUT 3-0 of the first level is equal to the input bit count of the LUT 7-0 having the same number in the first level. Furthermore, the bit count of information bits included in the input bits or output bits and the bit count of signal point group designation bits of the 0th LUT 3-0 of the first level are equal to those of the LUT 7-0 having the same number in the first level. These relationships also apply to LUTs of corresponding level in the distribution matching circuit 1 and the distribution dematching circuit 5.

In an LUT included in the distribution matching circuit 1111 and an LUT included in the distribution dematching circuit 2111, the relationship between an address and data is reversed. For example, in a case where the distribution matching circuit 1111 is the distribution matching circuit 1 illustrated in FIG. 1 and the distribution dematching circuit 2111 is the distribution dematching circuit 5 illustrated in FIG. 4, if a first address designates first data in the LUT 3-0 of the first level, in the corresponding LUT 7-0 of the first level, a second address that is the first data designates second data that is the first address. That is, in a case where the LUT 3-0 designates signal point group designation bits as the first data by the first address which includes information bits of the external input information and the signal point group designation bits input from an LUT of an immediately upper level, in the LUT 7-0, the second data that is the first address is designated using the first data as the second address. These relationships also apply to LUTs of corresponding levels in the distribution matching circuit 1 and the distribution dematching circuit 5.

In input and output interfaces of the LUTs included in the distribution matching circuit 1111, parameters may be selected so that the output bit count is larger than the input bit count. For example, in a case where the LUTs included in the distribution matching circuit 1111 are regarded as LUTs on the transmission side and the LUTs included in the distribution dematching circuit 2111 are regarded as LUTs on the reception side, if the LUTs on the transmission side has a greater output bit count than an input bit count, the bit count of addresses in the LUTs on the reception side is greater than that in the LUTs on the transmission side. Therefore, there is a possibility that the LUTs on the reception side have an address that does not exist in the LUTs on the transmission side.

When there is no error in the signal input to the distribution dematching circuit 2111, the output data of the LUTs on the transmission side completely correspond to the addresses of the LUTs on the reception side that are paired thereto; however, this does not always apply in a case where there are residual errors in the signal input to the distribution dematching circuit 2111. Therefore, in the optical transmission system 9, the relationship between an address and data that does not exist in the LUTs on the transmission side is defined in the LUTs on the reception side. That is, the address list on the distribution matching circuit 1111 side may be used as the data list on the distribution dematching circuit 2111 side, and at least the data list on the distribution matching circuit 1111 side may be used as the address list on the distribution dematching circuit 2111 side. Furthermore, as data for addresses not included in the data list on the distribution matching circuit 1111 side, selection may be made from the address list on the distribution dematching circuit 2111 side while accepting redundancy.

For example, in a case where the address of the LUT 4-0 is represented by two bits and data is represented by three bits, the address has four patterns, a square of 2, and output data of three bits corresponding to each of the four patterns is assigned. For example, let us assume that data 0, 1, 2, and 4 are assigned to each of addresses 0, 1, 2, and 3. At this point, the corresponding LUT 6-0 on the reception side has an address of three bits and data of two bits. An address that can be used by the LUT 6-0 has eight patterns, 2 to the power of 3 (0, 1, 2, 3, 4, 5, 6, 7), whereas data output from the LUT 4-0 has four patterns (0, 1, 2, 4) out of the eight patterns. Here, considering that an error may occur when the signal is transferred from the LUT 4-0 to the LUT 6-0, even data that is not included in the output data list (0, 1, 2, 4) of the LUT 4-0 needs to be included in the input address list of the LUT 6-0. Here, this applies to 3, 5, 6, and 7. Of course, there is no corresponding input addresses for 3, 5, 6, and 7 that are not in the output data of the LUT 4-0. Therefore, output data for the input addresses 3, 5, 6, and 7 of the LUT 6-0 is selected from among 0, 1, 2, and 3 as appropriate so that errors after passing through the LUT 6-0 is reduced. For example, 1, 2, 3, and 3 are set while accepting redundancy.

Furthermore, configuring the optical transmission system 9 under the following conditions can simplify implementation of circuits.

(1) Fix the relationship between the address and data in LUTs belonging to the same level in each of the distribution matching circuit and the distribution dematching circuit.

(2) Fix the input bit count in LUTs belonging to the same level in each of the distribution matching circuit and the distribution dematching circuit.

(3) Fix the output bit count in LUTs belonging to the same level in each of the distribution matching circuit and the distribution dematching circuit.

(4) Set the input bit count and the output bit count of LUTs at less than or equal to 16.

(5) In the reception signal compensation processing circuit 2120, an equalizer and a carrier wave restoration circuit are operated on the basis of a known signal (for example, pilot signal).

The above conditions (1), (2), and (3) can significantly reduce the number of combinations of address-data relationships stored in LUTs. As a result, the capacity of original data retaining the address-to-data relationships can be compressed, writing to the LUTs can be performed simultaneously, and time required for writing to the LUTs can be shortened. Also, sharing the interface condition among the LUTs allows circuits that have already been designed to be reused. Condition (4) directly contributes to reduction of the size of each LUT. Since the number of addresses increases exponentially as the input bit count of the LUTs increases, the LUTs are hierarchized to suppress the input bit count per LUT. The input bit count on the distribution matching side corresponds to the output bit count on the distribution dematching side, and the output bit count on the distribution matching side corresponds to the input bit count on the distribution dematching side, and thus it is desirable to suppress the input bit count and the output bit count of the distribution matching side and the distribution dematching side. Condition (5) corresponds to that it is desirable that the recovery process of various signals be operated normally even when the signal constellation or the occurrence probability of each signal point is flexibly changed, and that a process can be operated independently of signal point conditions instead of a process that is dependently on signal point conditions.

In the optical transmission system 9, the distribution matching circuit 1111 may have a configuration in which a plurality of transmission systems, which is a plurality of LUTs forming a hierarchical tree structure, is arranged in parallel. Furthermore, the distribution dematching circuit 2111 may have a configuration in which a plurality of reception systems, which is a plurality of LUTs forming a hierarchical tree structure, is arranged in parallel. As a result, a process using the LUTs of the distribution matching circuit 1111 can be performed in parallel, and likewise a process using the LUTs of the distribution dematching circuit 2111 can be performed in parallel, and thus processes can be performed efficiently.

A clock cycle in which no main signal is input, that is, input data is undefined, may be used in the distribution matching circuit 1111 and the distribution dematching circuit 2111. A main signal is a client signal or a frame signal. For example, the circuits may be operated at a frequency 1% faster than the operating frequency of the main signal, and the main signal may be input for 100 clock cycles, whereas no main signal is input for one clock cycle to allow the content of the LUTs to be updated in this one clock cycle.

Furthermore, the external input information may include both valid bits that is to be used as information and invalid bits that is not to be used as information. For example, in the optical transmission system 9, external input information obtained by rearranging valid bits and invalid bits upstream of the distribution matching circuit 1111 is input to the distribution matching circuit 1111. Furthermore, valid bits and invalid bits of the external input information restored by the distribution dematching circuit 2111 are rearranged downstream of the distribution dematching circuit 2111. Note that the symbol rate of an electric signal that drives the optical modulator 1400 may be set to 64 Gsymbol/s, for example.

As described above, in the optical transmission system 9 according to the third embodiment, the optical transmission device 10 includes the distribution matching circuit 1111 and the symbol mapping circuit 1112, and the optical reception device 11 includes the symbol demapping circuit 2112 and the distribution dematching circuit 2111. With this configuration, the optical transmission system 9 can obtain the effects described in the first and second embodiments.

Fourth Embodiment

Figure 11:
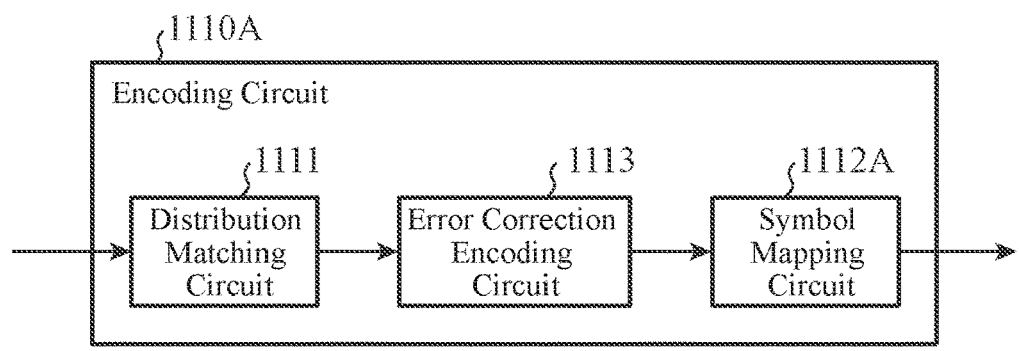
FIG. 11 is a block diagram illustrating the configuration of an encoding circuit according to a fourth embodiment.
Figure 12:
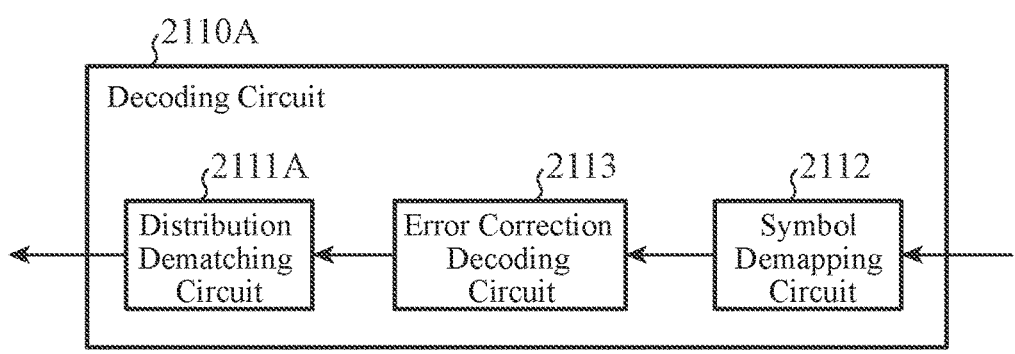
FIG. 12 is a block diagram illustrating the configuration of a decoding circuit according to the fourth embodiment.

FIG. 11 is a block diagram illustrating the configuration of an encoding circuit 1110A according to a fourth embodiment. In FIG. 11, the same component as that in FIG. 9 is denoted by the same symbol, and detailed description thereof is omitted. The encoding circuit 1110A is included in place of the encoding circuit 1110 in the optical transmission device 10 illustrated in FIG. 8. FIG. 12 is a block diagram illustrating the configuration of a decoding circuit 2110A according to the fourth embodiment. In FIG. 12, the same component as that in FIG. 10 is denoted by the same symbol, and detailed description thereof is omitted. The decoding circuit 2110A is included instead of the decoding circuit 2110 in the optical reception device 11 illustrated in FIG. 8.

As illustrated in FIG. 11, the encoding circuit 1110A includes a distribution matching circuit 1111, a symbol mapping circuit 1112A, and an error correction encoding circuit 1113. The error correction encoding circuit 1113 performs systematic error correction encoding on the signal point information input from the distribution matching circuit 1111 and outputs an error correction information bit and an error correction parity bit to the symbol mapping circuit 1112A. Note that the distribution matching circuit 1111 may use a frame format in which an error correction parity area is secured in advance for the signal output to the error correction encoding circuit 1113.

The symbol mapping circuit 1112A generates modulation symbols on the basis of the error correction information bit and the error correction parity bit input from the error correction encoding circuit 1113 and outputs the modulation symbols to the transmission signal compensation processing circuit 1120. It is normal that the mark rate of error correction parity bits cannot be controlled (around 0.5), and probabilistic shaping cannot be performed. In this case, the symbol mapping circuit 1112A assigns an error correction parity bit as a sign bit for controlling the positive and negative polarity of a modulation symbol. For example, in a one-sided pulse-amplitude modulation symbol having an amplitude of eight values, a bit count that affects the amplitude of the modulation symbol (so-called amplitude bit) is 2. The symbol mapping circuit 1112A maintains the combination of these two bits and assigns a parity bit. However, in a case where these constraints cannot be satisfied, for example, an error correction parity bit may be assigned to the amplitude bit, or a distribution-matched amplitude bit may be assigned to a sign bit.

As illustrated in FIG. 12, the decoding circuit 2110A includes a distribution dematching circuit 2111A, a symbol demapping circuit 2112, and an error correction decoding circuit 2113. The error correction decoding circuit 2113 performs error correction decoding on a signal input from the symbol demapping circuit 2112, and outputs the corrected error correction information bit to the distribution dematching circuit 2111A.

The distribution dematching circuit 2111A performs the distribution dematching described in the second embodiment on the signal input from the error correction decoding circuit 2113, and outputs a restored client signal or frame signal to the outside. Alternatively, the distribution dematching circuit 2111A may handle the signal input from the error correction decoding circuit 2113 as signal of a frame format signal in which an error correction parity area is secured in advance.

Moreover, bits may be rearranged between the distribution matching circuit 1111 and the error correction encoding circuit 1113. For example, a low-density parity-check code used for error correction encoding varies in correction capability in a code space. For this reason, in some cases a bit with poor performance among modulated bits is arranged on a side with high correction capability, and a bit with high performance among the modulated bits is arranged on a side with low correction capability. For example, three bits are assigned to one pulse-amplitude modulation symbol having an amplitude of eight values, and the performance differs among the bits. In this case, there are three bit levels. To assign bit levels to the code space for error correction is called bit level mapping. Bit level mapping performed between the distribution matching circuit 1111 and the error correction encoding circuit 1113 is restored between the error correction decoding circuit 2113 and the distribution dematching circuit 2111A. This process is called bit level demapping.

As described above, the encoding circuit 1110A according to the fourth embodiment includes the error correction encoding circuit 1113, and the symbol mapping circuit 1112A converts the signal point information subjected to error correction encoding by the error correction encoding circuit 1113 into modulation symbols. The decoding circuit 2110A according to the fourth embodiment includes the error correction decoding circuit 2113, and the distribution dematching circuit 2111A restores the external input information on the basis of the result of error correction decoding by the error correction decoding circuit 2113. In the conventional technology, if an error remains in a signal subjected to distribution dematching, decoding is impossible, and one word becomes totally erroneous. On the other hand, the decoding circuit 2110A according to the fourth embodiment can partially decode even if an error remains in a signal input to the distribution dematching circuit 2111A. As a result, it is possible to correct the error remaining in the signal.

Fifth Embodiment

Figure 13:
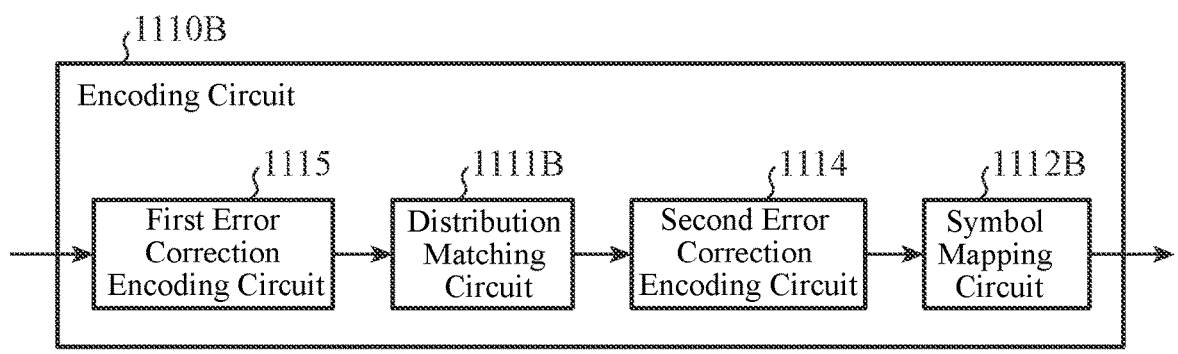
FIG. 13 is a block diagram illustrating the configuration of an encoding circuit according to a fifth embodiment.
Figure 14:
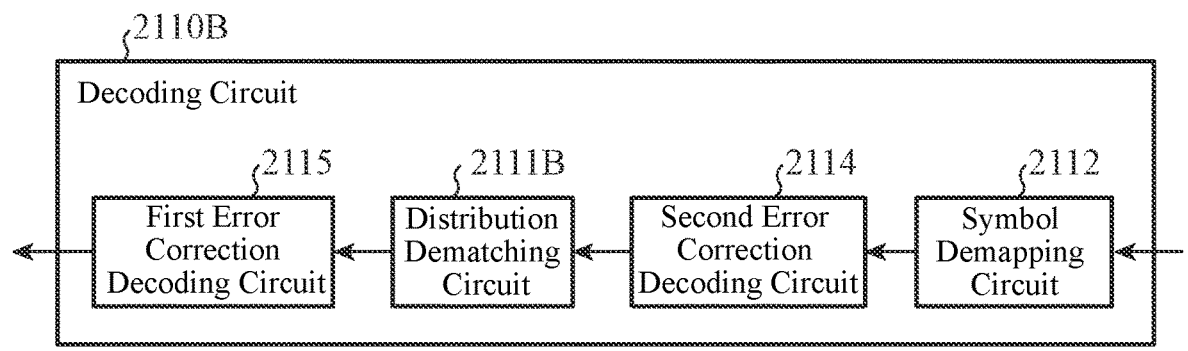
FIG. 14 is a block diagram illustrating the configuration of a decoding circuit according to the fifth embodiment.

FIG. 13 is a block diagram illustrating the configuration of an encoding circuit 1110B according to a fifth embodiment. In FIG. 13, the same component as that in FIG. 9 is denoted by the same symbol, and detailed description thereof is omitted. The encoding circuit 1110B is included in place of the encoding circuit 1110 in the optical transmission device 10 illustrated in FIG. 8. FIG. 14 is a block diagram illustrating the configuration of a decoding circuit 2110B according to the fifth embodiment. In FIG. 14, the same component as that in FIG. 10 is denoted by the same symbol, and detailed description thereof is omitted. The decoding circuit 2110B is included instead of the decoding circuit 2110 in the optical reception device 11 illustrated in FIG. 8.

As illustrated in FIG. 13, the encoding circuit 1110B includes a distribution matching circuit 1111B, a symbol mapping circuit 1112B, a second error correction encoding circuit 1114, and a first error correction encoding circuit 1115. The first error correction encoding circuit 1115 performs desired error correction encoding on a client signal or a frame signal input from the outside, and outputs the encoded bits to the distribution matching circuit 1111B. An error correction information bit obtained by the error correction encoding by the first error correction encoding circuit 1115 is called an external code error correction information bit.

The distribution matching circuit 1111B performs the distribution matching described in the first embodiment on the signal input from the first error correction encoding circuit 1115, and outputs the signal point information obtained by the distribution matching to the second error correction encoding circuit 1114. The second error correction encoding circuit 1114 performs systematic error correction encoding on the signal point information input from the distribution matching circuit 1111B and outputs an error correction information bit and an error correction parity bit to the symbol mapping circuit 1112B. Note that the error correction information bit and the error correction parity bit obtained by the error correction encoding by the second error correction encoding circuit 1114 are called an inner code error correction information bit and an inner code error correction parity bit.

The symbol mapping circuit 1112B generates modulation symbols on the basis of the inner code error correction information bit and the inner code error correction parity bit input from the second error correction encoding circuit 1114 and outputs the modulation symbols to the transmission signal compensation processing circuit 1120. At this point, in a case where the mark rate of the inner code error correction parity bit is close to 0.5 and probabilistic shaping cannot be performed, the symbol mapping circuit 1112B assigns an inner code error correction parity bit as a sign bit for controlling the positive and negative polarity of the modulation symbols.

As illustrated in FIG. 14, the decoding circuit 2110B includes a distribution dematching circuit 2111B, the symbol demapping circuit 2112, a second error correction decoding circuit 2114, and a first error correction decoding circuit 2115. The second error correction decoding circuit 2114 performs error correction decoding on a signal input from the symbol demapping circuit 2112, and outputs the error correction information bit obtained by the error correction decoding to the distribution dematching circuit 2111B. The error correction information bit obtained by the error correction decoding by the second error correction decoding circuit 2114 is called an inner code error correction information bit.

The distribution dematching circuit 2111B performs the distribution dematching described in the second embodiment on the inner code error correction information bit input from the second error correction decoding circuit 2114, and outputs the client signal or the frame signal restored by the distribution dematching to the first error correction decoding circuit 2115. The first error correction decoding circuit 2115 performs error correction decoding on the signal input from the distribution dematching circuit 2111B, and outputs the obtained error correction information bit to the outside as a restored client signal or frame signal. The error correction information bit obtained by the error correction decoding by the first error correction decoding circuit 2115 is called an external code error correction information bit.

As described above, the encoding circuit 1110B according to the fifth embodiment includes the first error correction encoding circuit 1115 and the second error correction encoding circuit 1114. The distribution matching circuit 1111B inputs the external input information subjected to error correction encoding by the first error correction encoding circuit 1115 and outputs signal point information, and the symbol mapping circuit 1112B converts the signal point information subjected to the error correction encoding by the second error correction encoding circuit 1114 into a modulation symbol. The decoding circuit 2110B according to the fifth embodiment includes the first error correction decoding circuit 2115 and the second error correction decoding circuit 2114. The distribution dematching circuit 2111B restores the external input information on the basis of the inner code error correction information bit obtained by the second error correction decoding circuit 2114. The external input information output from the distribution dematching circuit 2111B is subjected to error correction decoding by the first error correction decoding circuit 2115, and the external code error correction information bit is output to the outside as restored external input information.

By performing probabilistic shaping in the optical transmission systems illustrated in the third to fifth embodiments, it is possible to reduce the SNR required for obtaining normal communication quality for example by 0.3 to 1.1 dB for signals achieving the same frequency utilization efficiency without performing probabilistic shaping.

Moreover, the circuit resources required for a distribution matching circuit and a distribution dematching circuit include, for example, RAMs or ROMs for small-scale LUTs and flip-flops and selectors for delay adjustment, and no adding processes or multiplication processes that require bit precision are required. As a result, it is not necessary to implement a plurality of arithmetic circuits in parallel, and thus it is possible to reduce the circuit scale and power consumption of the distribution matching circuit. It is also useful for large capacity optical transmission.

Note that the present invention is not limited to the above embodiments, and the present invention may include a flexible combination of the embodiments, a modification of any component of the embodiments, or omission of any component in the embodiments within the scope of the present invention.

INDUSTRIAL APPLICABILITY

A distribution matching circuit according to the present invention enables downsizing of the circuit scale, and thus is applicable to an optical transmission device of an optical transmission system.

REFERENCE SIGNS LIST 1, 1111, 1111B: distribution matching circuit, 2-0, 3-0, 3-1, 4-0, 4-1, 4-2, 4-3, 6-0, 6-1, 6-2, 6-3, 7-0, 7-1, 8-0: lookup table (LUT), 5, 2111, 2111A, 2111B: distribution dematching circuit, 9: optical transmission system, 10: optical transmission device, 11: optical reception device, 12: optical transmission path, 100: processing circuit, 101: processor, 102: memory, 1100: transmission signal processing circuit, 1110, 1110A, 1110B: encoding circuit, 1112, 1112A, 1112B: symbol mapping circuit, 1113: error correction encoding circuit, 1114: second error correction encoding circuit, 1115: first error correction encoding circuit, 1120: transmission signal compensation processing circuit, 1200: DA converter, 1300, 2300: light source, 1400: optical modulator, 2100: reception signal processing circuit, 2110, 2110A, 2110B: decoding circuit, 2112: symbol demapping circuit, 2113: error correction decoding circuit, 2114: second error correction decoding circuit, 2115: first error correction decoding circuit, 2120: reception signal compensation processing circuit, 2200: AD converter, 2400: optical receiver

The invention claimed is:

1. A distribution matching circuit, comprising processing circuitry to implement a plurality of lookup tables forming a hierarchical tree structure, wherein an uppermost level lookup table among the plurality of lookup tables converts first part of external input information into first designation information, designating a combination of signal point groups in first signal space, the first signal space being managed by each of the plurality of lookup tables in an immediately lower level of an uppermost level, and outputs the designation information to each of the plurality of lookup tables in the immediately lower level of the uppermost level, each of a plurality of intermediate level lookup tables from a level immediately below the uppermost level to a level immediately above a lowermost level among the plurality of lookup tables converts a bit sequence including second part of external input information and the first designation information input from a lookup table belonging to an immediately upper level into second designation information that designates a combination of signal point groups in second signal space managed by each of the plurality of lookup tables in an immediately lower level of each of the plurality of intermediate level lookup tables, and outputs the second designation information to each of the plurality of lookup tables in the immediately lower level of each of the plurality of intermediate level lookup tables, and each of a plurality of lowermost level lookup tables among the plurality of lookup tables converts a bit sequence including third part of external input information and the second designation information input from the plurality of lookup tables of an immediately upper level into third signal point information indicating signal constellation in third signal space managed by each of the plurality of lowermost level lookup tables, and outputs the third signal point information.

2. The distribution matching circuit according to claim 1, wherein, in lookup tables of a same level among the plurality of lookup tables, an input bit count, an output bit count, a number of lookup tables in an immediately lower level that are connected to a lookup table in an immediately upper level, and a relationship between an address and data are each fixed.

3. The distribution matching circuit according to claim 1, wherein the external input information includes both a valid bit that is to be used as information and an invalid bit that is not to be used as information.

4. The distribution matching circuit according to claim 1, wherein there is a clock cycle during which a main signal is not input.

5. A distribution matching circuit, comprising processing circuitry to implement a plurality of lookup tables, wherein a part of the plurality of lookup tables converts a bit sequence, including a part of external input information and designation information that designates a combination of signal point groups in a signal space managed by each of the part of the plurality of lookup tables, into signal point information indicating signal constellation in a signal space managed by each of the part of the plurality of lookup tables, and outputs the signal point information, and wherein the plurality of lookup tables is hierarchized to form a tree structure of two levels, an upper level lookup table among the plurality of lookup tables converts a part of the external input information into designation information that designates a combination of signal point groups in a signal space managed by each of a plurality of lower level lookup tables among the plurality of lookup tables, and outputs the designation information to each of the plurality of lower level lookup tables, and each of the plurality of lower level lookup tables converts a bit sequence including a part of the external input information and the designation information input from the upper level lookup table into signal point information indicating a signal constellation in a signal space managed by each of the plurality of lower level lookup tables and outputs the signal point information.

6. A distribution dematching circuit, comprising processing circuitry to implement a plurality of lookup tables forming a hierarchical tree structure, wherein each of the plurality of lowermost level lookup tables among the plurality of lookup tables restores, from the bit sequence of signal point information output from the distribution matching circuit according to claim 1 and obtained via a communication channel, a part of the external input information and designation information from lookup tables of the immediately upper level in the plurality of lowermost level lookup tables included in the distribution matching circuit, immediate level lookup tables from a level immediately above the lowermost level to a level immediately below the uppermost level among the plurality of lookup tables restore, from bit sequences of designation information restored by lookup tables of an immediately lower level, a part of the external input information and designation information from lookup tables of an immediately upper level in a lookup table in an immediately upper level included in the distribution matching circuit, and an uppermost level lookup table restores, from bit sequences of designation information restored by lookup tables in an immediately lower level, a part of the external input information in the uppermost level lookup table included in the distribution matching circuit and outputs all restored parts of the external input information.

7. The distribution dematching circuit according to claim 6,
wherein, in lookup tables of a same level among the plurality of lookup tables, an input bit count, an output bit count, a number of lookup tables in an immediately lower level that are connected to a lookup table in an immediately upper level, and a relationship between an address and data are each fixed.

8. The distribution dematching circuit according to claim 6,
wherein the external input information includes both a valid bit that is to be used as information and an invalid bit that is not to be used as information.

9. The distribution dematching circuit according to claim 6,
wherein there is a clock cycle during which a main signal is not input.

10. A distribution matching method for a distribution matching circuit comprising a plurality of lookup tables forming a hierarchical tree structure, the distribution matching method comprising the steps of:

by an uppermost level lookup table among the plurality of lookup tables, converting first part of external input information into first designation information, designating a combination of signal point groups in first signal space, the first signal space being managed by each of the plurality of lookup tables in an immediately lower level of the uppermost level, and outputting the designation information to each of the plurality of lookup tables in the immediately lower level, by a plurality or intermediate level lookup tables from a level immediately below the uppermost level to a level immediately above a lowermost level among the plurality of lookup tables, converting a bit sequence including second part of external input information and the first designation information input from a lookup table belonging to an immediately upper level into second designation information that designates a combination of signal point groups in second signal space managed by each of the plurality of lookup tables in an immediately lower level, and outputting the second designation information to each of the plurality of lookup tables in the immediately lower level, and by each of a plurality of lowermost level lookup tables, converting a bit sequence including third part of the external input information and the second designation information input from the plurality of lookup tables of the immediately upper level into third signal point information indicating signal constellation in third signal space managed by each of the plurality of lowermost level lookup tables, and outputting the signal point information.

11. A distribution dematching method for a distribution dematching circuit comprising a plurality of lookup tables forming a hierarchical tree structure, the distribution dematching method comprising the steps of:

by each of the plurality of lowermost level lookup tables among the plurality of lookup tables, restoring, from a bit sequence of signal point information output from the distribution matching circuit according to claim 1 and obtained via a communication channel, a part of the external input information and designation information from lookup tables of the immediately upper level in the plurality of lowermost level lookup tables included in the distribution matching circuit;

by intermediate level lookup tables from a level immediately above the lowermost level to a level immediately below the uppermost level among the plurality of lookup tables, restoring, from bit sequences of designation information restored by lookup tables of an immediately lower level, a part of the external input information and designation information from lookup tables of an immediately upper level in a lookup table in an immediately upper level included in the distribution matching circuit; and by an uppermost level lookup table, restoring, from bit sequences of designation information restored by lookup tables in an immediately lower level, a part of the external input information in the uppermost level lookup table included in the distribution matching circuit and outputting all restored parts of the external input information.

12. An optical transmission system, comprising: an optical transmission device generating an optical signal obtained by encoding external input information; and an optical reception device restoring the external input information on a basis of the optical signal received from the optical transmission device, wherein the optical transmission device includes:
the distribution matching circuit according to claim 1 which receives the external input information and outputs signal point information; and
a symbol mapping circuit converting the signal point information into a modulation symbol, and
the optical reception device includes:

a symbol demapping circuit converting the modulation symbol included in the optical signal received from the optical transmission device into a reception bit sequence or a reception bit likelihood; and the distribution dematching circuit according to claim 6 which restores the external input information on a basis of the reception bit sequence or the reception bit likelihood.

13. The optical transmission system according to claim 12, wherein the optical transmission device further includes an error correction encoding circuit performing error correction encoding on the signal point information, the symbol mapping circuit converts the signal point information subjected to error correction encoding by the error correction encoding circuit into a modulation symbol, the optical reception device further includes an error correction decoding circuit performing error correction decoding on the reception bit sequence or the reception bit likelihood input from the symbol demapping circuit, and the distribution dematching circuit restores the external input information on a basis of the reception bit sequence or the reception bit likelihood subjected to error correction decoding by the error correction decoding circuit.

14. The optical transmission system according to claim 12, wherein the optical transmission device further includes:

a first error correction encoding circuit performing error correction encoding on the external input information; and a second error correction encoding circuit performing error correction encoding on the signal point information, the distribution matching circuit receives the external input information subjected to error correction encoding by the first error correction encoding circuit and outputs the signal point information, the symbol mapping circuit converts the signal point information subjected to error correction encoding by the second error correction encoding circuit into a modulation symbol, the optical reception device further includes:

a first error correction decoding circuit performing error correction decoding on the external input information restored by the distribution dematching circuit; and a second error correction decoding circuit performing error correction decoding on the reception bit sequence or the reception bit likelihood input from the symbol demapping circuit, and the distribution dematching circuit restores the external input information on a basis of the reception bit sequence or the reception bit likelihood subjected to error correction decoding by the second error correction decoding circuit.

15. The optical transmission system according to claim 12, wherein the distribution matching circuit sorts a plurality of pieces of signal point information output from each of a plurality of lowermost level lookup tables under any one of conditions of sorting in ascending order of modulation symbol power defined after conversion into the modulation symbol by the symbol mapping circuit, sorting in descending order of a number of zeros included in the signal point information, and sorting in descending order of expected values of a number of ones included in the signal point information, and establishes association with ascending order of addresses.

16. The optical transmission system according to claim 12, wherein the distribution matching circuit sorts designation information from lookup tables of levels from an uppermost level to a level immediately above a lowermost level under any one of conditions of sorting in ascending order of expected values of modulation symbol power defined after conversion into the modulation symbol by the symbol mapping circuit, sorting in descending order of expected values of a number of zeros included in the signal point information, and sorting in descending order of expected values of a number of ones included in the signal point information, and establishes association with ascending order of addresses.

17. The optical transmission system according to claim 12, wherein an input bit count and an output bit count are same or the output bit count is larger than the input bit count in each of the plurality of lookup tables included in the distribution matching circuit, and an input bit count and an output bit count are same or the output bit count is smaller than the input bit count in each of the plurality of lookup tables included in the distribution dematching circuit.

18. The optical transmission system according to claim 12, wherein in each of the distribution matching circuit and the distribution dematching circuit, a number of lookup tables in an immediately lower level connected to a lookup table in an immediately upper level is a constant, an input bit count on the distribution matching circuit side is a same as an output bit count on the distribution dematching circuit side for lookup tables of a same level and a same number, and an output bit count on the distribution matching circuit side is a same as an input bit count on the distribution dematching circuit side for lookup tables of a same level and a same number, an address list on the distribution matching circuit side is used as a data list on the distribution dematching circuit side, at least a data list on the distribution matching circuit side is used as an address list on the distribution dematching circuit side, and data for an address not included in the data list on the distribution matching circuit side is selected from the address list on the distribution dematching circuit side while accepting redundancy.

19. The optical transmission system according to claim 13, wherein the symbol mapping circuit converts the signal point information into a modulation symbol on a basis of an error correction information bit and an error correction parity bit input from the error correction encoding circuit, and assigns the error correction parity bit to a sign bit of the modulation symbol.

20. The optical transmission system according to claim 12, wherein, in the distribution matching circuit, a plurality of transmission systems including a plurality of lookup tables forming a hierarchical tree structure is arranged in parallel, and in the distribution dematching circuit, a plurality of reception systems including a plurality of lookup tables forming a hierarchical tree structure is arranged in parallel.

21. The optical transmission system according to claim 12,
wherein a lookup table included in each of the distribution matching circuit and the distribution dematching circuit has an input bit count and an output bit count each being less than or equal to 16.

* * * * *